Figure 1:
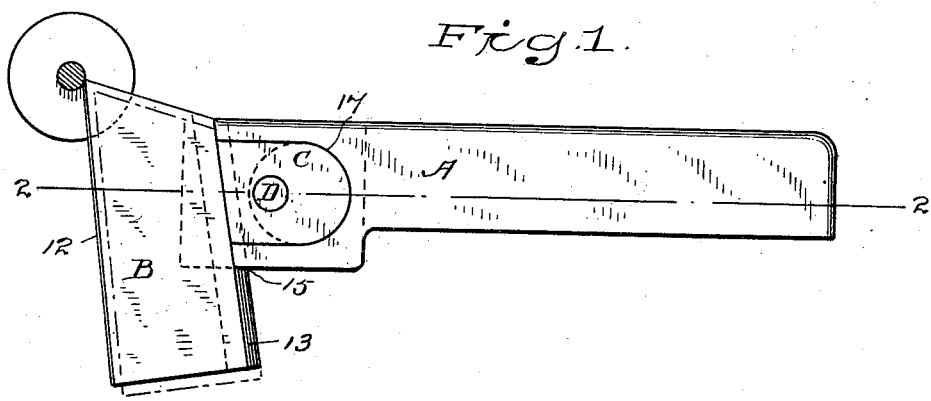

No. 713,001. Patented Nov. 4, 1902.
C. W. GRANT.
CUTTING-OFF TOOL.
(Application filed Feb. 3, 1902.)
(No Model.)

WITNESSES.
H. H. Lamb.
S. W. Atherton.

INVENTOR.
Charles W. Grant
By A. M. Wooster
Atty.

UNITED STATES PATENT OFFICE.

CHARLES W. GRANT, OF DERBY, CONNECTICUT, ASSIGNOR TO THE O. K. TOOL COMPANY, OF SHELTON, CONNECTICUT, A CORPORATION OF NEW YORK.

CUTTING-OFF TOOL.

SPECIFICATION forming part of Letters Patent No. 713,001, dated November 4, 1902.

Application filed February 3, 1902. Serial No. 92,318. (No model.)

*To all whom it may concern:*

Be it known that I, CHARLES W. GRANT, a citizen of the United States, residing at Derby, county of New Haven, State of Connecticut, have invented a new and useful Cutting-Off Tool, of which the following is a specification.

My invention has for its object to provide a vertically-adjustable cutting-off tool the profile of whose cutting-face will insure a flat face to parts cut off and will permit a part to be broken off after cutting down to one-third of its diameter without danger of the fracture extending within the surface of the part broken off or the main part, thereby saving time in the amount of cutting required and preventing the loss of parts through the fracture extending beneath the surface, in which the cutter shall be so held as to recede from too heavy a cut or when the feed is too fast, so as to avoid danger of breaking the cutter, in which the cutter shall be so shaped as to provide a clearance from the cutting edge toward the rear and a clearance from the cutting edge downward, in which the cutter shall require grinding on one surface only, and from which the cutter may be removed without disturbing the holder. With these ends in view I have devised the novel triple-edged vertically-adjustable cutting-off tool which I will now describe, referring to the accompanying drawings, forming part of this specification, and using reference characters to designate the several parts.

Figure 2:
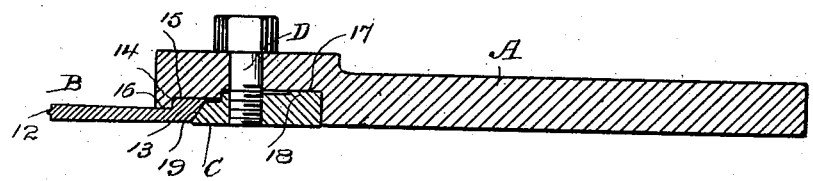
Figure 3:
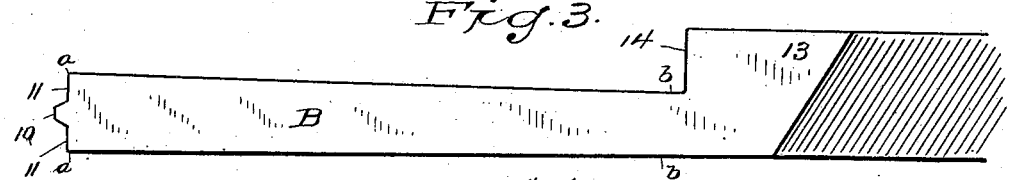
Figure 4:
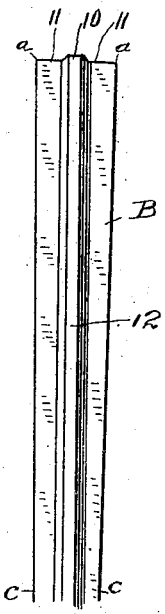

Figure 1 is an elevation of my novel cutting-off tool as in use; Fig. 2, a section on the line 2 2 in Fig. 1; Fig. 3, a plan view of the cutter, on a greatly-enlarged scale, showing the rearward and inward taper from the cutting edges; and Fig. 4 is a face view of the cutter on the same scale, showing the downward and inward taper from the cutting edges.

The tool as a whole comprises four parts—a holder, (indicated by A,) a cutter, (indicated by B,) a clamping-piece, (indicated by C,) and a locking-screw, (indicated by D.)

My invention relates both to the shape of the cutter and to the position in which it is secured in the holder. An important feature of the cutter is that it is provided with a central cutting edge (indicated by 10) and two lateral, but not laterally-acting, cutting edges, (indicated by 11.) In its operative position the top plane of the cutter inclines backward and downward from the horizontal plane, and the front face of the cutter inclines downward and inward from the vertical plane. The front face of the cutter is provided with a three-sided angular rib 12. The central cutting edge 10 is at the apex of this rib—that is, at the top of the cutter—and the lateral cutting edges 11 are on the opposite sides of the rib. In use the central cutting edge 10 leads and cuts a small groove, thereby dividing the chip into three parts and permitting a very fast feed of the cutter. In order to give clearance from the cutting edges to the rear of the cutter, I make the sides of the cutter incline inward slightly toward each other, as from the points indicated by $a$ to the points indicated by $b$ in Fig. 3. In order to give clearance from the cutting edges to the lower end of the cutter, I make the sides of the cutter incline inward slightly toward each other from the top of the cutter to the lower end thereof, as from the points indicated by $a$ to the points indicated by $c$ in Fig. 4. At the back of the cutter—that is, opposite to the face—and on its inner side I provide an enlargement 13. The front face of this enlargement, which I have indicated by 14, lies parallel with the cutting edges, and the back of the enlargement—that is, the rear face of the cutter as a whole—lies in a plane inclined to the planes of face 14 and the cutting edges, the inner side of the enlargement being widest and the incline being from the outer side outward toward the inner side of the cutter.

The holder is provided with a downwardly and backwardly inclined undercut recess 15 to receive enlargement 13 in front of said recess, with an abutment 16, on which the inner face of the cutter rests, and back of recess 15 with a recess 17, which is deeper than or extends below the plane of the bottom of recess 15. Said recess 17 is in the present instance made circular, which receives a corresponding boss 18 on clamping-piece C.

The clamping-piece as a whole is made to correspond in shape with recesses 15 and 17, an important feature being that the front edge of the clamping-piece, which is indicated by 19, inclines downward and backward in the vertical plane and inward and backward in the horizontal plane in order to conform to the inclined rear face of the enlargement 13 upon the cutter.

In assembling, the cutter is slid into inclined undercut recess 15, the inner side of the cutter resting on abutment 16. The clamping-piece is then dropped into recesses 15 and 17 and locked there by the screw D, which passes through both the holder and the clamping-piece, both the clamping-piece and the outer side of the cutter lying substantially flush with the side of the holder, as clearly shown in Fig. 2.

In use, as after grinding, the cutter may be readily reset without disturbing the holder. When at the desired adjustment, it may be locked there by turning up the screw, but not tightly. If the screw is tightened up until it just sets, but without additional pressure, it will lock the cutter firmly for all the ordinary conditions of use. If, however, undue strain is brought to bear upon the cutter, it will yield downward and backward slightly in the inclined recess, and thus avoid danger of breaking the cutter. Owing to the fact that the recess 17 is deeper than the recess 15 and that the clamping-piece corresponds in shape therewith, said clamping-piece is maintained steadily in its position without tightening up the screw to such an extent as might clamp the cutter too rigidly. The slight inward taper of the sides of the cutter from front to back and from top to bottom insures perfect clearance under all the ordinary conditions of use, no matter how deep a cut is made, so that friction between the sides of the cutter and the piece of metal that is being operated upon is wholly avoided. In grinding, the top of the cutter only is operated upon. It will be noted that in use the three cutting edges produce three independent chips and that when the cut stops there will be a groove at the center thereof which has been cut by the central cutting edge 10. This I find a great advantage, as it is not necessary to make as deep a cut as with ordinary cutting-tools, and in breaking off a part there is no danger of the fracture extending inward within the side of the piece, which has been a serious difficulty heretofore and has rendered it necessary to make the cut much deeper than with my novel cutter.

It will be observed that the walls of the recess 17 extend forward above and below the clamping-piece C to the inclined rear face of the cutter. The forward ends of these walls therefore effect a closure which prevents access of chips or dust to the coacting inclined faces of the block C and the cutter B, thus leaving these coacting clamping-pieces clean and in condition to secure the best clamping effect.

Having thus described my invention, I claim—

1. In a tool of the character described the combination with a holder having a downwardly and rearwardly extending undercut recess and a recess 17, and a cutter having a correspondingly-inclined rear face, of a clamping-piece having an inclined face corresponding with the rear edge of the cutter and a boss adapted to engage recess 17, the walls of the recess extending forward to and closely fitting the rear face of the cutter substantially as described.

2. The combination with a cutter having a cutting edge formed at the intersection of the top with the front face which meet at an acute angle and an enlargement at the back having a rear face inclining outward and backward from the outer sides, of a holder having an undercut recess inclining downward and backward from the side, and a clamping-piece for yieldingly securing the cutter in said recess at any desired adjustment, said holder having the upper and lower walls of said recess extending forward to and closely fitting the rear face of the cutter.

In testimony whereof I affix my signature in presence of two witnesses.

CHARLES W. GRANT.

Witnesses:
GEORGE W. CONKLIN,
W. H. KNIGHT.